(12) United States Patent  
Madan et al.

(10) Patent No.: US 8,046,784 B2
(45) Date of Patent: Oct. 25, 2011

(54) OPTICAL DISC RECORD SYSTEM AND METHOD, AND AN OPTICAL PICKUP ACTUATOR UNIT FOR SUCH A SYSTEM

(75) Inventors: Pushpakath Madan, Singapore (SG); Peter M. S. M. Heijmans, Eindhoven (NL); Michael Maris, Drachten (NL)

(73) Assignee: Arima Devices Corporation, Tortola (VG)

( * ) Notice: Subject to any disclaimer, the term of this patent is extended or adjusted under 35 U.S.C. 154(b) by 897 days.

(21) Appl. No.: 11/814,312

(22) PCT Filed: Jan. 18, 2006

(86) PCT No.: PCT/IB2006/050183
§ 371 (c)(1),
(2), (4) Date: Mar. 11, 2008

(87) PCT Pub. No.: WO2006/077538
PCT Pub. Date: Jul. 27, 2006

(65) Prior Publication Data
US 2008/0165664 A1 Jul. 10, 2008

(30) Foreign Application Priority Data
Jan. 20, 2005 (EP) .................................... 05100321

(51) Int. Cl.
*G11B 7/09* (2006.01)
(52) U.S. Cl. ....................................................... 720/685
(58) Field of Classification Search .................. 720/685; 369/219.1
See application file for complete search history.

(56) References Cited

U.S. PATENT DOCUMENTS

| 5,208,703 | A | 5/1993 | Ikegame et al. |
| 6,643,229 | B1 | 11/2003 | Yamaguchi |
| 7,567,486 | B2 * | 7/2009 | Ju et al. .................... 369/44.15 |

FOREIGN PATENT DOCUMENTS

| EP | 0326246 A2 | 8/1989 |
| JP | 08321057 | * 12/1996 |
| JP | 11039953 | 2/1999 |
| WO | 9854705 A1 | 12/1998 |

* cited by examiner

*Primary Examiner* — Angel A. Castro
(74) *Attorney, Agent, or Firm* — Volpe and Koenig, P.C.

(57) ABSTRACT

An optical disc record system comprising an optical pickup actuator unit for transferring data to and/or from a rotating optical disc. The optical pickup actuator unit comprises a fixed part (1) and a movable part (2) carrying an objective lens (4) for focusing a light beam on the optical disc. The movable part (2) is connected to the fixed part (1) by a number of substantially parallel elastic suspension wires (5). The movable part (2) is provided with a number of coils (8, 9, 15, 16, 17) of electrically conductive wires, which coils (8, 9, 15, 16, 17) are at least partly present in a magnetic field generated by magnets (10, 11, 18). At least one electrically conductive stranded wire (22, 23) is present between said fixed part (1) and said movable part (2) in order to feed electric current to at least one coil (16, 17).

10 Claims, 2 Drawing Sheets

OPTICAL DISC RECORD SYSTEM AND METHOD, AND AN OPTICAL PICKUP ACTUATOR UNIT FOR SUCH A SYSTEM

The invention relates to an optical disc record system comprising an optical pickup actuator unit for transferring data to and/or from a rotating optical disc, which optical pickup actuator unit comprises a fixed part, i.e. a stationary part, and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, and which movable part is provided with a number of coils of electrically conductive wires, which coils are at least partly present in a magnetic field generated by magnets that are attached to said fixed part in order to drive said movable part relative to said fixed part. The optical pickup device comprising the objective lens is integrated in said movable part of the optical pickup actuator unit. In order to be able to reach each relevant location of the recording surface of the rotating optical disc, said fixed part of the optical pickup actuator unit can be displaced in radial directions over the recording surface of the rotating optical disc.

Such a system is described in U.S. Pat. No. 6,643,229, where the movable part, i.e. the lens holder, is connected to the fixed part of the optical pickup actuator unit by means of four parallel suspension wires. Said movable part comprises a focusing coil for adjusting the distance between said movable part and the recording surface of the rotating optical disc, as well as two tracking coils for moving said movable part in radial directions with respect to the rotating optical disc in order to follow deviations of the spiraling track on the recording surface of the rotating optical disc, which track is able to contain the recorded data. The four elastic suspension wires are made of electrically conductive metal, and two of them are used to feed electric current to the focusing coil, the other two suspension wires being used to feed electric current to the two tracking coils.

Apart from the focusing movement (perpendicular to the recording surface of the rotating optical disc) and the tracking movement (parallel to the recording surface of the rotating optical disc), it may be required that the movable part of the optical pickup actuator unit also performs other movements, such as a tilting movement in order to compensate for a wrap or a curvature of the recording surface of the rotating optical disc. According to U.S. Pat. No. 6,643,229, such a tilting movement is driven by two tilt coils that are attached to the fixed part of the optical pickup actuator unit, while corresponding magnets are attached to the movable part of the optical pickup actuator unit. These corresponding magnets create a magnetic field in which at least a portion of each tilt coil is present.

However, the presence of a magnet at the movable part of the optical pickup actuator unit has disadvantages. The weight of the magnet affects the movability of the movable part and, furthermore, the magnet may be influenced by forces arising from metal being present in the vicinity of the magnet, which forces will displace the movable part. Therefore it is preferred to attach the magnets to the fixed part of the optical pickup actuator unit while the movable part is provided with the electric coil that cooperates with the magnets. If such an additional coil is present on the movable part, however, additional means to feed electric current to said coil are also needed, which means may also affect the movability of the movable part of the optical pickup actuator unit.

In order to feed electric current to the additional coils, it has been proposed to make use of additional electrically conductive suspension wires which are directed parallel to the other suspension wires. However, such additional suspension wires make the construction quite complicated and require additional space, which may not be available.

An object of the invention is to provide an optical disc record system comprising an optical pickup actuator unit for transferring data to and/or from a rotating optical disc, wherein the movable part of the optical pickup actuator unit comprises a number of coils of electrically conductive wires, and wherein electric current is fed to the coils in an effective and efficient manner.

To achieve this object, at least one electrically conductive stranded wire is present between said fixed part and said movable part in order to feed electric current to at least one electric coil. In particular, such a stranded wire comprises a number of thin electrically conductive wires which are braided together. For example, three copper wires are braided together, each having a diameter of 25 μm, while each wire may be provided with an electrically insulating coating. Such a stranded wire is able to feed a sufficient electric current to the electric coil or coils and is relatively flexible, so that it will not transfer substantial forces to the movable part of the optical pickup actuator unit.

In one preferred embodiment, said at least one coil is made of a stranded wire, which wire furthermore forms two stranded wires for feeding electric current to said coil, which two stranded wires are present between said fixed part and said movable part. The use of one and the same wire for creating the coil and for feeding electric current from the fixed part of the optical pickup actuator unit to the coil on the movable part renders it possible to make a simple and effective design in which the weight is reduced because of the absence of any connection means between the wire of the coil and the wire for feeding electric current to the coil. Instead of one coil, two or more coils may also be made of stranded wires, in which case two coils may be connected in series, so that two stranded wires can serve to feed electric current to both coils.

Preferably, at least a portion of said at least one stranded wire between said fixed part and said movable part is directed substantially parallel to said suspension wires. Such an orientation of at least a portion, preferably a main portion, of the stranded wire further reduces the force that may be transferred to the movable part of the optical pickup actuator unit by the stranded wire, because it reduces the degree of bending of the stranded wire when the movable part moves.

In one preferred embodiment, said movable part comprises a focusing coil for adjusting the distance between said movable part and the recording surface of the optical disc, one or two tracking coils for moving said movable part in radial directions with respect to the rotating optical disc, and two tilt coils for rotating said movable part about an axis extending in said radial direction. Such an arrangement of coils can move the movable part of the optical pickup actuator unit in each desired direction, including a rotational direction for adjusting the direction of the objective lens with respect to the recording surface of the optical disc.

Preferably, electric current is also fed to at least one of said coils through at least one and preferably all of said suspension wires, which are made of elastic and electrically conductive material. Existing components (the suspension wires) are thus used for feeding the coils, so that the number of stranded wires is limited. In one preferred embodiment, said movable part is connected to said fixed part by at least three, and preferably four, electrically conductive suspension wires, such that each of said suspension wires is electrically conductively connected to one of said coils, and said movable part comprises at least three electric coils.

The invention furthermore relates to an optical pickup actuator unit for transferring data to and/or from a rotating optical disc, which optical pickup actuator unit comprises a fixed part and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, and which movable part is provided with a number of coils of electrically conductive wires, which coils are at least partly present in a magnetic field generated by magnets that are attached to said fixed part in order to drive said movable part relative to said fixed part, at least one electrically conductive stranded wire being present between said fixed part and said movable part in order to feed electric current to at least one coil.

The invention also relates to an optical disc record method whereby data is transferred by means of an optical pickup actuator unit to and/or from a rotating optical disc, which optical pickup actuator unit comprises a fixed part and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, and which movable part is driven relative to said fixed part by means of a number of coils of electrically conductive wires, which coils are at least partly present in a magnetic field generated by magnets that are attached to said fixed part, electric current being fed to at least one of said coils by means of an electrically conductive stranded wire between said fixed part and said movable part.

The invention will now be further elucidated by means of a description of an example of an optical pickup actuator unit comprising a fixed part and a movable part carrying an objective lens for focusing a light beam on the optical disc, reference being made to the drawing comprising three Figures, in which.

Figure 1:
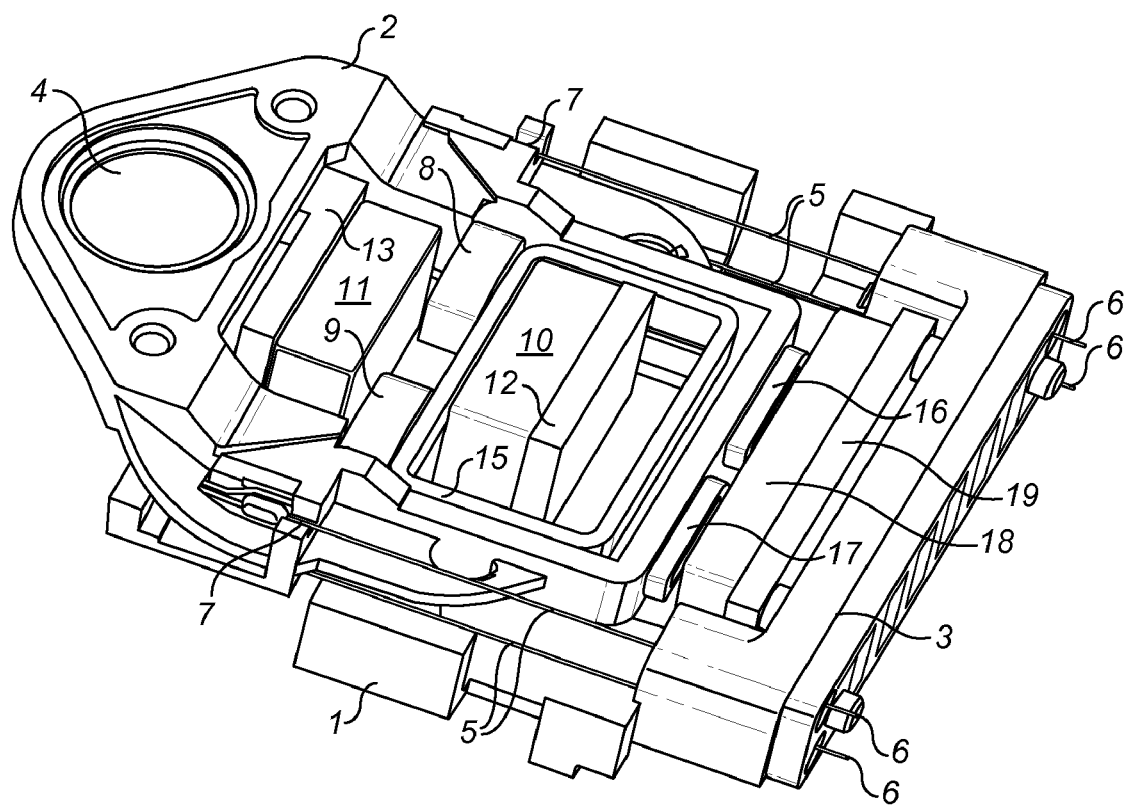
FIG. 1 shows an optical pickup actuator unit in perspective view.

The embodiment of an optical pickup actuator unit as shown in FIG. 1 is composed of a fixed part 1 and a movable part 2. The fixed part 1 comprises a base part 3, which base part 3 can be attached to a member of the optical record system that can be displaced in radial directions with respect to the rotating optical disc. Because of the two movements, i.e. the rotating movement of the optical disc and the linear movement in radial directions of the optical pickup actuator unit, the objective lens 4 of the optical pickup actuator unit can follow a spiraling path with respect to the recording surface of the optical disc, which path corresponds to the data-containing spiraling track on the recording surface of the optical disc.

Figure 2:
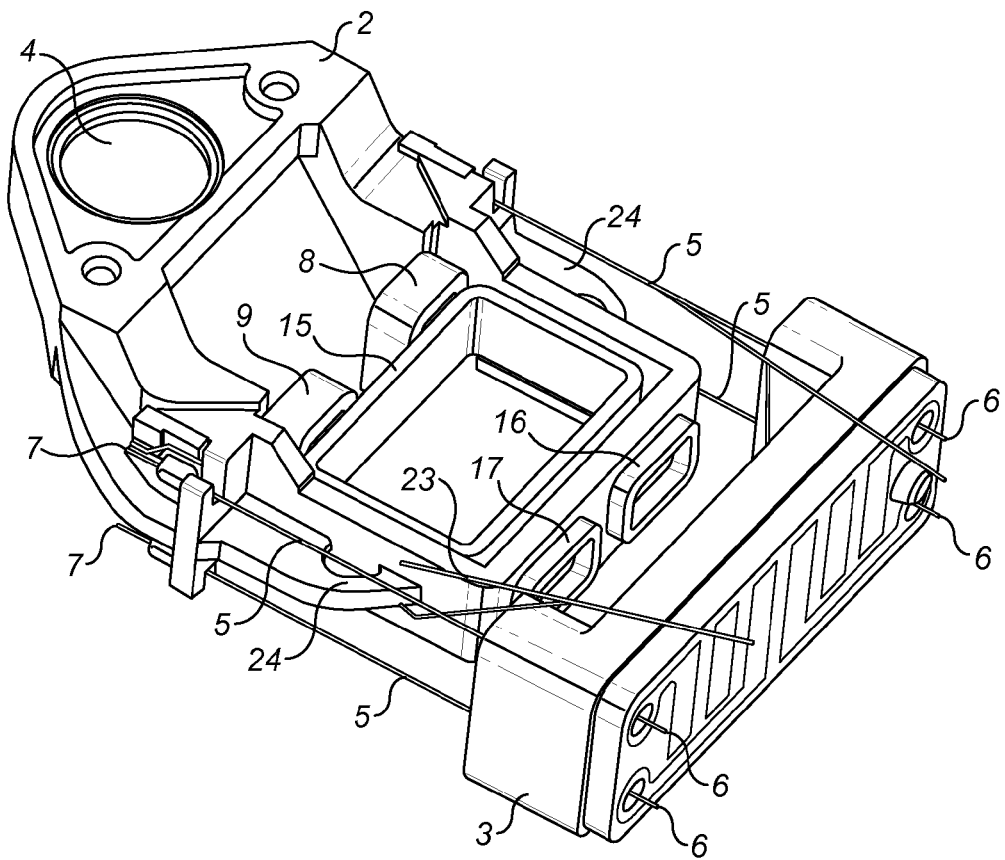
FIG. 2 shows the optical pickup actuator unit with a portion of the fixed part removed.

In order to keep the objective lens 4 continuously in a correct position with respect to said spiraling track on the recording surface of the rotating optical disc, the movable part 2 of the optical pickup actuator unit can move with respect to the fixed part 1. The movable part 2 is connected to the fixed part 1 by means of four mutually parallel elastic suspension wires 5, so that the movable part 2 can move in a plane that is positioned perpendicularly to the four suspension wires 5. FIG. 2 shows the movable part 2 and the base part 3 of the fixed part 1, to which base part 3 the four suspension wires are attached near one of their ends 6, while the other ends 7 are attached to the movable part 2.

In the described embodiment, the movable part 2 can perform three different movements: a tracking movement in tangential direction with respect to the rotating optical disc, a focusing movement perpendicular to the recording surface of the rotating optical disc, and a tilting movement about an axis in radial direction along said recoding surface. All these three movements are driven by means of electric coils that are attached to the movable part 2, at least a portion of each electric coil being present in a magnetic field created by magnets attached to the fixed part 1 of the optical pickup actuator unit.

The tracking movement is driven by means of two tracking coils 8,9. These two tracking coils 8,9 are connected in series such that the electric current flows in opposite directions through the wires of the coils 8, 9, i.e. clockwise in one coil 8; 9 and counterclockwise in the other coil 9; 8. The electric currents in the two abutting portions of the tracking coils 8, 9 accordingly have the same direction (perpendicular to the recording surface of the rotating optical disc). These two abutting portions are present in a magnetic field between the two magnets 10, 11, which two magnets 10, 11 are attached to carrier elements 12, 13 of the fixed part 1 of the optical pickup actuator unit. Therefore, an electric current through the two tracking coils 8, 9 will result in a movement of the movable part 2 in radial direction with respect to the rotating optical disc, i.e. in a direction transverse to the spiraling track on the recording surface of the optical disc.

The focusing movement of the movable part 2 of the pickup actuator unit is driven by means of a focusing coil 15 that is positioned in a plane parallel to the recording surface of the rotating optical disc, such that a portion of the focusing coil 15 is present in said magnetic field between the two magnets 10, 11. Therefore, an electric current in the focusing coil 15 will result in a force being exerted on the movable part 2 of the optical pickup actuator unit in a direction perpendicular to the recording surface of the rotating optical disc, i.e. perpendicular to the plane in which the objective lens 4 is positioned. So, the objective lens 4 will move towards or away from the rotating optical disc, depending on the direction and the amperage of the electric current through the focusing coil 15.

The tilting movement of the movable part 2 of the pickup actuator unit is driven by means of two tilt coils 16, 17. The two tilt coils 16, 17 are connected in series such that the electric currents through these two coils 16, 17 flow in opposite directions, i.e. clockwise in one coil 16; 17 and counterclockwise in the other coil 17; 16. The two tilt coils 16, 17 are positioned near a two-pole magnet 18, which magnet 18 is attached to a carrier element 19 of the fixed part 1 of the optical pickup actuator unit.

Figure 3:
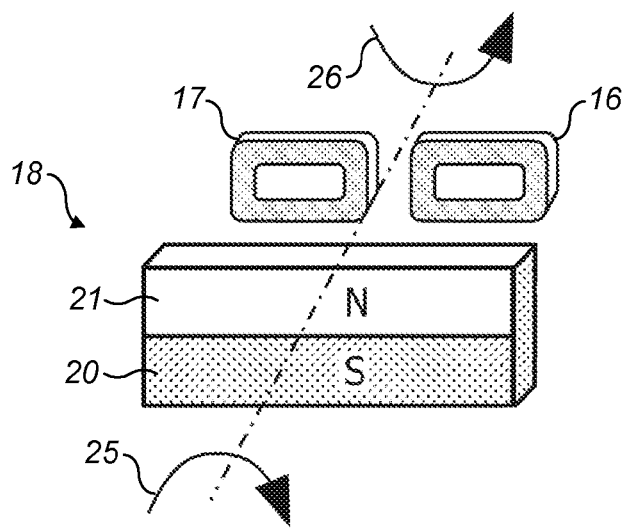
FIG. 3 shows a two-pole magnet and two electric tilt coils.

FIG. 3 shows diagrammatically in a perspective exploded view the two-pole magnet 18 and the two tilt coils 16, 17. The lower part 20 and the upper part 21 of the two-pole magnet 18 have different polar orientations. The two tilt coils 16, 17 are arranged near the two pole-magnet 18 in such a manner that the lower parts of the two tilt coils 16, 17 abut against the lower part 20 of the magnet 18, and the upper parts of the two tilt coils 16, 17 abut against the upper part 21 of the magnet 18. An electric current through the two tilt coils 16, 17 will thus result in a tilting movement of the movable part 2 of the optical pickup actuator unit, depending on the direction and the amperage of the electric current. The tilting force between the magnet 18 and the two coils 16, 17 is indicated with the arrows 25, 26.

In order to feed an electric current to the tracking coils 8, 9 and to the focusing coil 15, the four suspension wires 5 are made of electrically conducting metal and are used to supply electricity from the fixed part 1 of the optical pickup actuator unit to the movable part 2, to which part 2 the coils 8, 9, 15 are attached, without exerting any additional force on the movable part 2.

In order to feed an electric current to the tilt coils 16, 17, electrically conductive stranded wires 22, 23 are arranged between the base part 3 of the fixed part 1 and the movable part 2, as is shown in FIG. 2. The stranded wires 22, 23 are fixed to the base part 3 and to support members 24 of the movable part 2, so that a portion of each stranded wires 22, 23 is directed substantially parallel to the suspension wires 5. Therefore, the force exerted by the stranded wires 22, 23 on the movable part 2 is extremely small. The stranded wires 22, 23 are guided from said support members 24 to the coils 16, 17. Not only the wires 22, 23 are stranded wires; the two tilt coils 16, 17 are also made of the same stranded wire material, so that no connection means for connecting the stranded wires 22, 23 to the wire of the coils 16, 17 are required. The weight and the number of components are reduced thereby.

The embodiment of the optical pickup actuator unit as described above is only an example; a great many other embodiments are possible.

The invention claimed is:

1. An optical disc record system comprising an optical pickup actuator unit for transferring data to and/or from a rotating optical disc, which optical pickup actuator unit comprises a fixed part and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, and which movable part is provided with a number of coils of electrically conductive wires, which coils are at least partly present in a magnetic field generated by magnets attached to said fixed part in order to drive said movable part relative to said fixed part, wherein at least one electrically conductive stranded wire is provided between said fixed part and said movable part in order to feed electric current to at least one coil.

2. A system as claimed in claim 1, wherein said at least one coil is made of a stranded wire, which wire furthermore forms two stranded wires for feeding electric current to said coil, which two stranded wires are present between said fixed part and said movable part.

3. A system as claimed in claim 1, wherein at least a portion of said at least one stranded wire between said fixed part and said movable part is directed substantially parallel to said suspension wires.

4. A system as claimed in claim 1, wherein said movable part comprises a focusing coil for adjusting the distance between said movable part and the surface of the optical disc, one or two tracking coils for moving said movable part in radial directions with respect to the rotating optical disc, and two tilt coils for rotating said movable part about an axis that extends in said radial direction.

5. A system as claimed in claim 1, wherein during operation electric current is fed to at least one of said coils through at least one of said suspension wires.

6. A system as claimed in claim 1, wherein said movable part is connected to said fixed part by at least three electrically conductive suspension wires, each of said suspension wires being electrically conductively connected to one of said coils.

7. A system as claimed in claim 6, wherein said movable part is connected to said fixed part by four suspension wires.

8. A system as claimed in claim 1, wherein said movable part of the optical pickup actuator unit is provided with three coils.

9. An optical pickup actuator unit for transferring data to and/or from a rotating optical disc, which optical pickup actuator unit comprises a fixed part and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, and which movable part is provided with a number of coils of electrically conductive wires, which coils are at least partly present in a magnetic field generated by magnets attached to said fixed part in order to drive said movable part relative to said fixed part, at least one electrically conductive stranded wire being provided between said fixed part and said movable part in order to feed electric current to at least one coil.

10. A method of transferring data to and/or from a rotating optical disc using an optical pickup actuator unit, which optical pickup actuator unit comprises a fixed part and a movable part carrying an objective lens for focusing a light beam on the optical disc, which movable part is connected to the fixed part by a number of substantially parallel elastic suspension wires, so that the movable part can move with respect to said fixed part in a plane substantially perpendicular to the longitudinal direction of said suspension wires, said method comprising: driving said movable part relative to said fixed part using a number of coils of electrically conductive wires, which coils are at least partly present in a magnetic field generated by magnets that are attached to said fixed part; and feeding electric current to at least one of said coils using an electrically conductive stranded wire between said fixed part and said movable part.

* * * * *